United States Patent
Ozaki et al.

(10) Patent No.: US 7,137,504 B2
(45) Date of Patent: Nov. 21, 2006

(54) CONVEYOR CHAIN

(75) Inventors: Hajime Ozaki, Osaka (JP); Katsutoshi Shibayama, Osaka (JP); Yoshihiro Murakami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 37 days.

(21) Appl. No.: 11/193,270

(22) Filed: Jul. 30, 2005

(65) Prior Publication Data

US 2006/0054470 A1   Mar. 16, 2006

(30) Foreign Application Priority Data

Sep. 3, 2004  (JP)  ............................. 2004-257438

(51) Int. Cl.
   *B65G 17/24*  (2006.01)
(52) U.S. Cl. ...................... 198/779; 198/853
(58) Field of Classification Search ................ 198/779, 198/850–853
   See application file for complete search history.

(56) References Cited

U.S. PATENT DOCUMENTS

| 6,318,544 | B1 * | 11/2001 | O'Connor et al. | .......... 198/853 |
| 6,367,616 | B1 * | 4/2002 | Lapeyre et al. | ............. 198/779 |
| 6,681,922 | B1 * | 1/2004 | Corley et al. | ............... 198/853 |

2005/0155846 A1   7/2005   Laitram

FOREIGN PATENT DOCUMENTS

| EP | 1316519 A2 | 6/2003 |
| EP | 1591383 A2 | 2/2005 |
| EP | ISR/EP05018329 | 12/2005 |
| JP | 2003-182829 | 3/2003 |
| JP | 2005-306552 A | 11/2005 |
| JP | 2005-314060 A | 11/2005 |
| WO | WO-2004-078619 A | 9/2004 |

* cited by examiner

*Primary Examiner*—James R. Bidwell
(74) *Attorney, Agent, or Firm*—Woodling, Krost and Rust (57) ABSTRACT

A conveyor chain having fewer parts is disclosed. The assembly and decomposition of the chain conveyor and the removal of the ball and the like can be easily performed. In a conveyor chain 100 in which chain links 110 having article loading portions 111 on which articles are loaded are adjacently, endlessly connected with each other with connecting pins. Between the hinge portions 113 disposed on one side edge of the article loading portion 111 is formed a U-shaped cutout portion 115 having a ball holding inner peripheral surface 115a, a free ball 130 inserted between a hinge portion 112 of the chain link 110 oppositely adjacent to the U-shaped cutout portion 115 and the U-shaped cutout portion 115 is rotatably held by the ball holding inner peripheral surface 115a and a stopper 140. The upper and lower portions of the free ball 130 are protruded from a surface of the article loading portion 111 and a lower end of the link portion 114, respectively.

1 Claim, 6 Drawing Sheets

CONVEYOR CHAIN

This application claims the benefit of prior filed Japanese Patent Application No. 2004-257438 filed Sep. 3, 2004.

TECHNICAL FIELD

The present invention relates to a conveyor chain suitable for loading and conveying articles each having a flat bottom surface such as a box, a plate and the like, and more specifically relates to a conveyor chain in which the upper and lower portions of a number of free balls are rotatably protruded from the upper surface and lower end of the conveyor chain, respectively.

BACKGROUND ART

As a conveyor belt, which is one of conveyor chains, which load and convey an article or articles, a conveyor belt has been known in which a belt module forming the conveyor belt is provided rotatable balls, the article or articles are managed on the conveying way to slide them on a lateral side of the belt so that they are discharged (see Japanese Laid-open Patent Publication No. 2003-182829).

The above-mentioned conveyor belt is formed as follows. Namely, a belt module, which loads an article, is formed by vertically stacking a first member and a second member to be united. And hinge portions, respectively formed in the first member and the second member, are joined to form a hinge portion of a belt module. Then a plurality of the belt modules are connected to each other with connecting pins so that the conveyor chain is formed. This belt module includes rotatable balls so that articles being conveyed on a conveyor belt are slid on the belt to be discharged onto a lateral side. The first member and the second member are each provided with an opening. When the first member and the second member are united, a ball-receiving portion is formed so that a ball is rotatably held on this ball-receiving portion.

Patent Reference 1 is Japanese Laid-open Patent Publication No. 2003-182829.

PROBLEMS TO BE SOLVED BY THE INVENTION

A conventional conveyor belt, which is one kind of conveyor belts, has a construction in which a belt module unites the first member and the second member and sandwiches a ball. Thus, the conventional conveyor has a problem that a parts count becomes large. Further, even in a case where one ball is taken out, a united belt module must be separated into two parts after pulling out a connecting pin. Thus, the conventional conveyor further has a problem that the operation of taking out the ball is troublesome.

Accordingly, the object of the present invention is to solve the above-mentioned prior art problem and to provide a conveyor chain in which an article loading portion forming a conveyor chain is formed of one member, the holding of a rotatable ball is carried out by a free ball-receiving portion and a stopper formed between adjacent chain links so that a parts count is reduced, and at the same time the assembly and decomposition of the chain conveyor and the removal of the ball and the like can be easily performed.

MEANS FOR SOLVING THE PROBLEMS

The above-mentioned problems are solved by a conveyor chain in which chain links each having an article loading portion on which an article is loaded, a plurality of hinge portions integrally formed on both side edges of the article loading portion and a link portion integrally formed on the back of said article loading portion are adjacently, endlessly connected with each other with connecting pins, characterized in that between the hinge portions disposed on one side edge of said article loading portion is formed a U-shaped cutout portion having a ball holding inner peripheral surface, a free ball inserted between a hinge portion of the chain link oppositely adjacent to the U-shaped cutout portion and said U-shaped cutout portion is rotatably held by the ball holding inner peripheral surface and a stopper, and the upper and lower portions of said free ball are protruded from a surface of the article loading portion and a lower end of said link portion, respectively.

EFFECTS OF THE INVENTION

The present invention includes the above-mentioned construction. Thus, the following peculiar effects can be obtained.

Namely, since article loading portion of a chain link, forming a conveyor chain, is formed of one member, a parts count of the chain link can be reduced. Further, since, between the hinge portions disposed on one side edge of said article loading portion is formed a U-shaped cutout portion having a ball holding inner peripheral surface, and a free ball inserted between a hinge portion of the chain link oppositely adjacent to the U-shaped cutout portion and said U-shaped cutout portion is rotatably held by the ball holding inner peripheral surface and a stopper, the free ball can be rotatably held so that it does not come out. Further, even in a case where the free ball is taken out, only removal of a pin disengagement preventing member, a connecting pin and a stopper permits taking out the ball so that assembly and decomposition of the conveyor chain can be easily performed and a parts count can be reduced. Further, since a stopper is intervened between the free ball and a hinge portion of the adjacent chain link and the hinge portion of the adjacent chain link does not make contact with the free ball, wear of the hinge portion of the chain link during reverse operation or rotation is suppressed so that life of the conveyor chain can be lengthened.

Further, since the upper and lower portions of the free ball are protruded from a surface of the article loading portion and a lower end of said link portion, respectively, a box-shaped, plate-shaped and the like article loaded on a conveyor chain can be slid and turned by free rotation of the free ball. As a result articles can be easily moved to both sides of the chain on the conveying way and discharged. Further, in a case where a guide plate is arranged on the lower surface side of the conveyor chain and a lower portion of the free ball abuts on the guide plate, since the free ball is rotated in the direction of travel with the travel of the conveyor chain, the articles can be speedily conveyed faster than the chain speed at the portion of the guide plate arrangement.

BRIEF DESCRIPTION OF THE DRAWINGS

FIGS. 5(A), 5(B), 5(C) and 5(D) are developed views of a chain link, showing the example according to the present invention, and particularly

The drawings will be better understood when reference is made to the Description Of The Invention and claims which follow hereinbelow.

DESCRIPTION OF THE INVENTION

Figure 1:
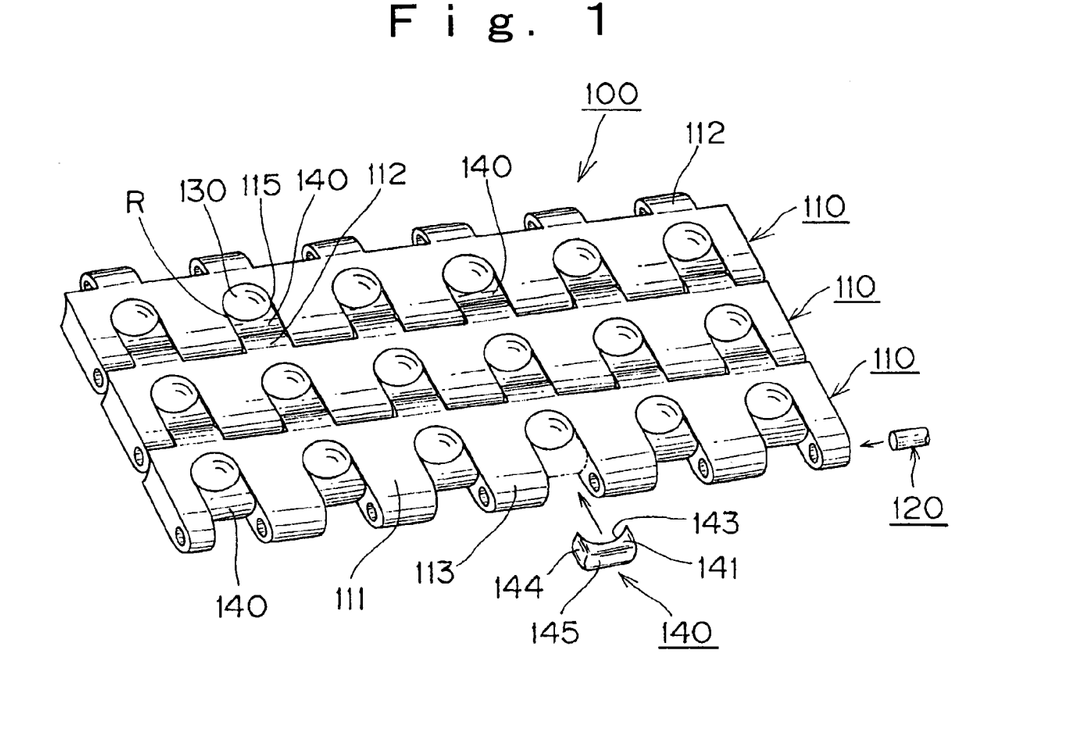
FIG. 1 is a perspective view of a part of a conveyor chain viewed from the surface side of the chain showing an example according to the present invention.
Figure 5:
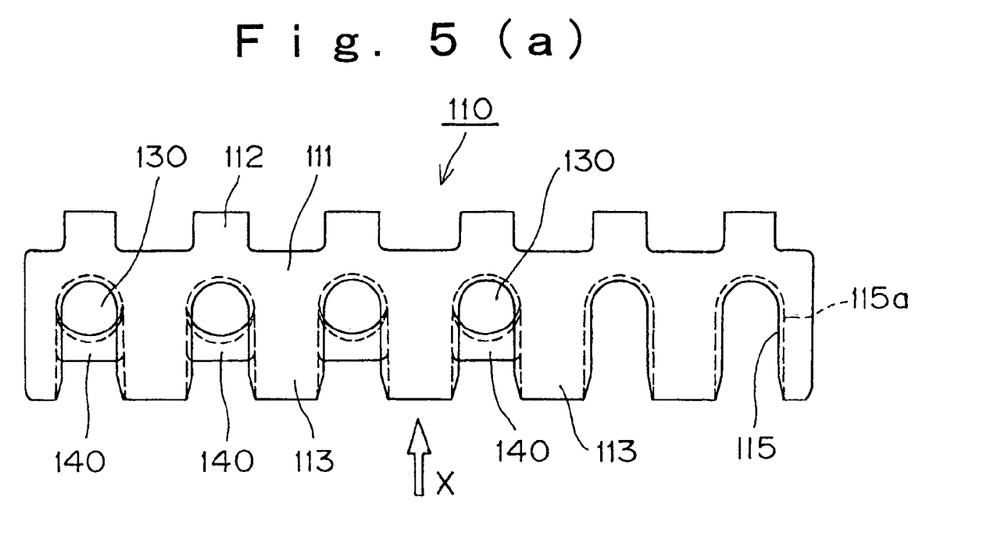
FIG. 5(A) is a plan view of the chain link on a conveying surface side.
FIG. 5(B) is a front view of the chain link in the direction of an arrow X in FIG. 5(A)
FIG. 5(C) is a front view of the chain link on a back side.
FIG. 5(D) is a front view of the chain link in the direction of an arrow Y in FIG. 5(C).
Figure 5C:
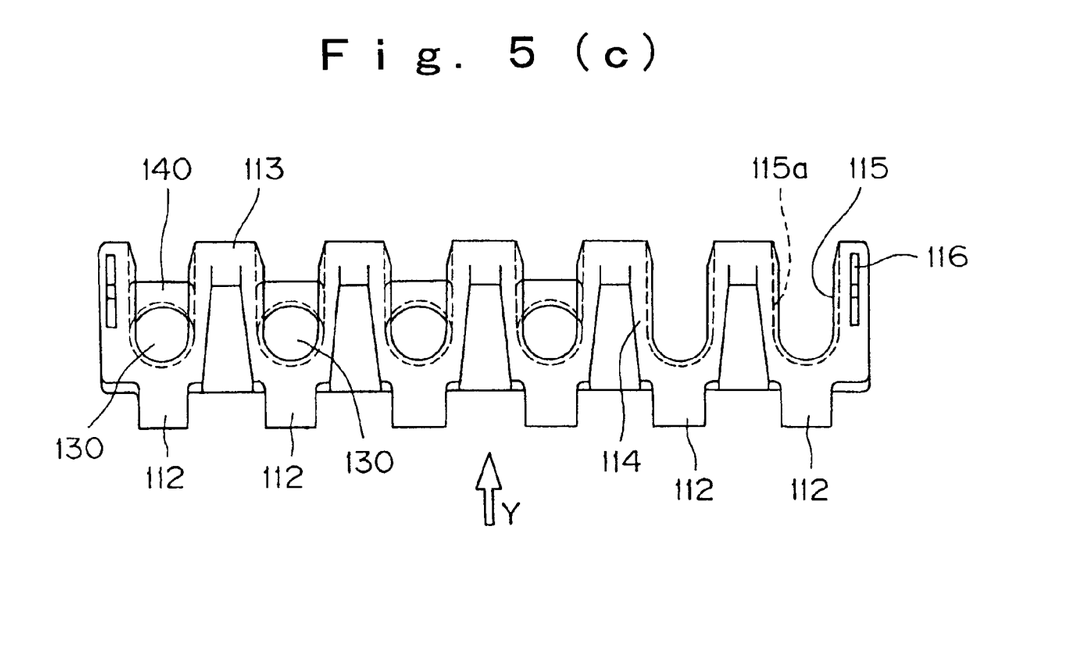
Figure 5D:
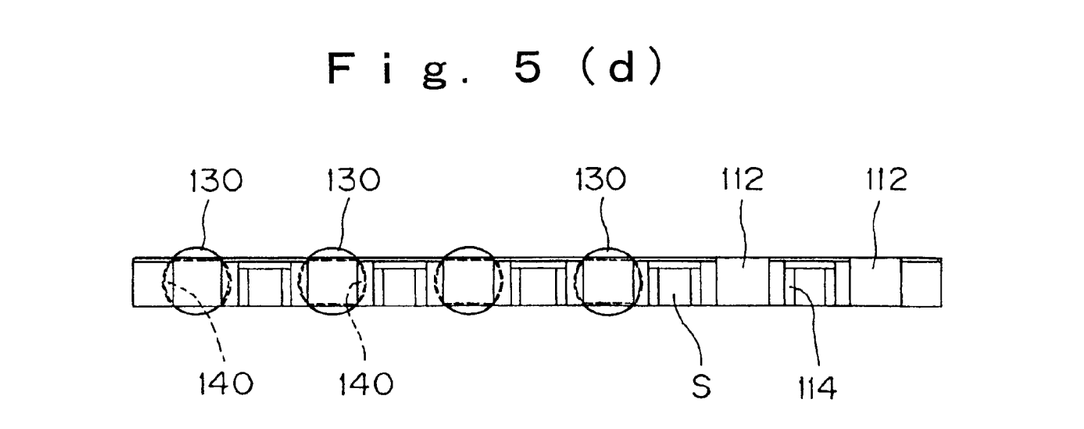
Figure 6:
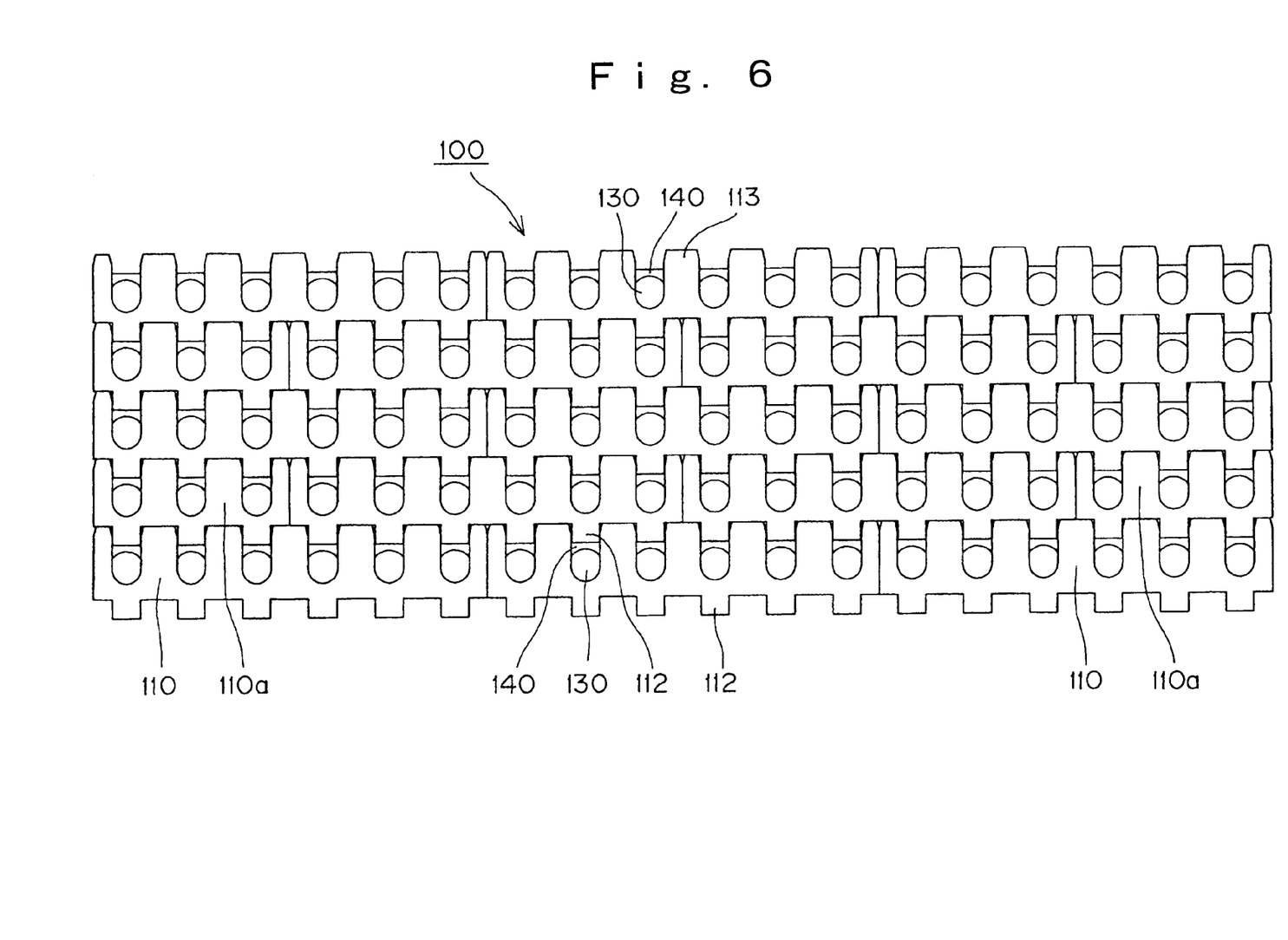
FIG. 6 is an explanatory view showing one example of an arrangement state of a chain link forming the conveyor chain according to the present invention showing the example according to the present invention.
Figure 7:
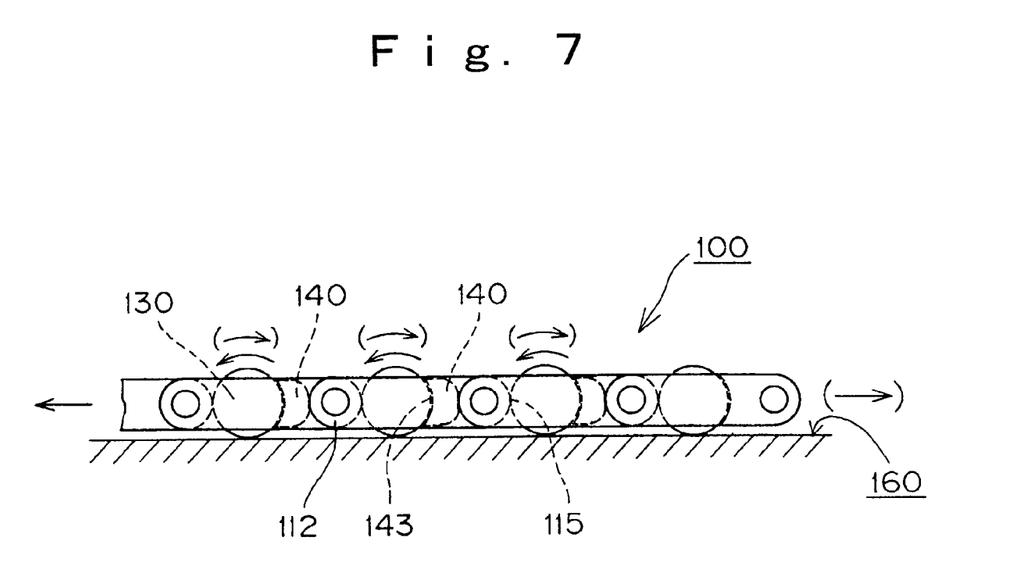
FIG. 7 is an explanatory view showing an operation state of the conveyor chain showing the example according to the present invention.

An example of the present invention will be described below with reference to FIGS. 1 to 7. FIG. 1 is a perspective view of a part of a conveyor chain according to the present invention viewed from the surface side of the chain, FIG. 2 is a perspective view of a chain link viewed from a surface (conveying surface) side, FIG. 3 is a perspective view of a part of the conveyor chain viewed from the back side of the chain, FIG. 4 is a perspective view viewed from a back surface side, FIGS. 5(A), 5(B), 5(C) and 5(D) are developed views of a chain link, and particularly FIG. 5(A) is a plan view of the chain link on a conveying surface side, FIG. 5(B) is a front view of the chain link in the direction of an arrow X in FIG. 5(A), FIG. 5(C) is a front view of the chain link on a back side, and FIG. 5(D) is a front view of the chain link in the direction of an arrow Y in FIG. 5(C), FIG. 6 is an explanatory view showing one example of an arrangement state of a chain link forming the conveyor chain according to the present invention, and FIG. 7 is an explanatory view showing an operation state of the conveyor chain according to the present invention.

Figure 3:
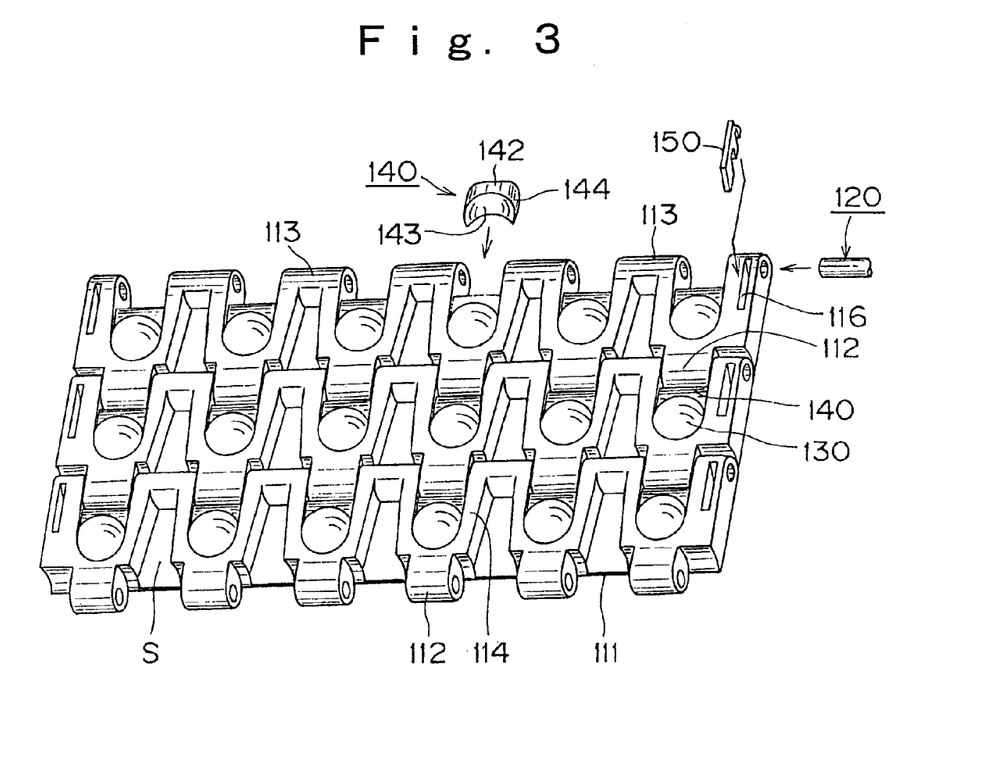
FIG. 3 is a perspective view of a part of the conveyor chain viewed from the back side of the chain showing the example according to the present invention.

As shown in FIGS. 1 and 3, a conveyor chain 100 is composed of a plurality of chain links 110 having article loading portions 111 on the upper surfaces of which articles W are loaded, a plurality of freely rotatable free balls provided near connecting portions of the chain link 110, stoppers 140, connecting pins 120 and pin disengagement preventing members 150.

Figure 2:
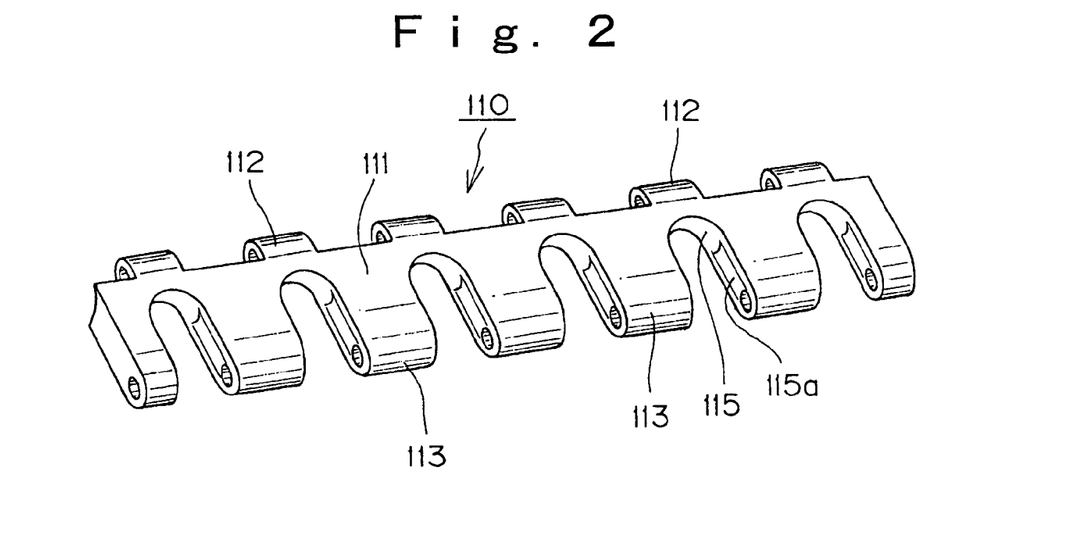
FIG. 2 is a perspective view of a chain link viewed from a surface (conveying surface) side showing the example according to the present invention.
Figure 4:
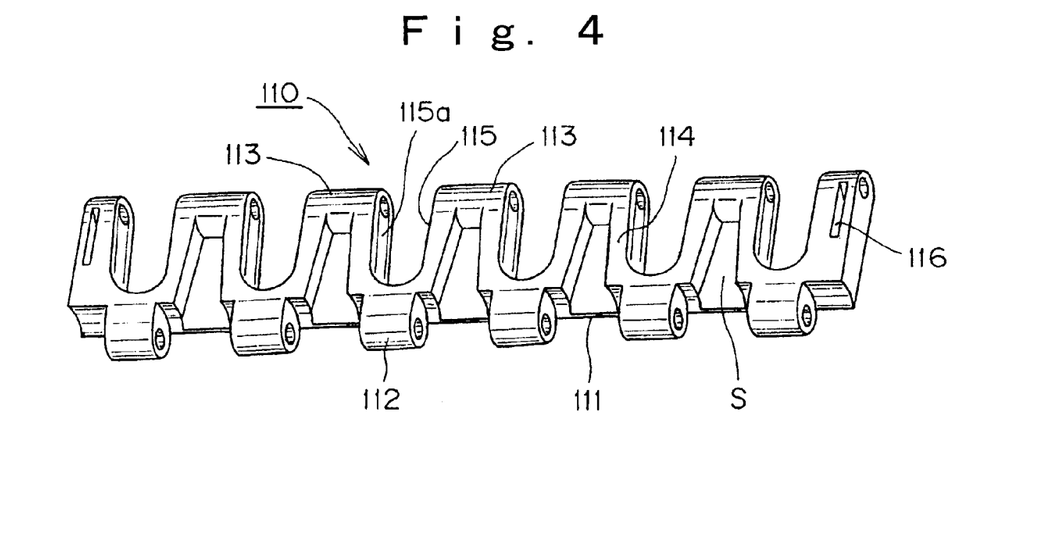
FIG. 4 is a perspective view viewed from a back surface side showing the example according to the present invention.

As shown in FIGS. 2 and 4, the chain link 110 has a plurality of hinge portions 112 and 113 on the front and rear of the article loading portions 111 respectively, and link portions formed on lower surfaces of the article loading portions 111. And between the hinge portions 113 and 113 formed on one side edge of the article loading portions 111 is formed a U-shaped cutout portion 115 having a ball holding inner peripheral surface 115a. And as shown in FIG. 1, in the conveyor chain 100 a plurality of chain links 1100 are adjacently endlessly connected to each other with connecting pins 120 and a free ball-receiving portion R is formed of a U-shaped cutout portion 115 near the connecting portion and a hinge portion 112 of a chain link oppositely adjacent to this U-shaped cutout portion 115. And a free ball 130 and a stopper 140 is inserted into this free ball-receiving portion R so that the free ball 130 is rotatably secured by the ball holding inner peripheral surface 115a and the stopper 140.

Further, as shown in FIGS. 3 and 4, on a link portion 114 formed on a lower surface of the article loading portion 111 is provided a sprocket engagement portion S, which engages with a sprocket, which drives the conveyor chain 100. In the present example, all link portions 114 are provided with sprocket engagement portions S so that a number of sprocket engagement portions S are arranged in a direction vertical to the direction of travel of the conveyor chain 100. This general-purpose use arrangement permits adaptation even to different numbers of sprockets or different spaces between sprockets. However, spaces between the sprockets may be appropriately are provided in accordance with the number and arrangement of the sprockets to be used without providing the sprocket engagement portions S on the all link portions 114.

It is noted that in FIGS. 1 and 3, the connecting pin 120 is shown only by a part of the entire length, and is however, substantially the same as the length of the chain link 110. Namely, the length of the connecting pin 120 is just a length, which is just accommodated between both ends grooves 116 of the chain link 110. And by fitting a pin disengagement preventing member 150 into the groove 116 the disengagement of the connecting pin 120 is prevented. Further, as shown in FIG. 6, this conveyor chain may be assembled to a brick-stacked state having a large width by using long chain links 110 and short (half length) chain links 110a.

As shown in FIGS. 5(A) to 5(D), the ball holding inner peripheral surface 115a is of a curved shape so that a part of an inserted free ball 130 is held so as not to come out to a chain conveying surface side or a back surface side of the chain. It is noted that the shape of the ball holding inner peripheral surface 115a is not limited to the above-mentioned curved shape but it may adopt any shape if a part of the free ball 130 is held and disengagement prevention is functioned. Further, the ball holding inner peripheral surface 115a may be provided with a discharge groove for wear powder or dust.

Further, as shown in FIGS. 1 and 3, the stopper 140 is a block with a flat upper surface 141 and a flat lower surface 142, and has height which does not protrude from the chain conveying surface and the back surface of the chain. A contact surface 143 of the stopper 140 with the free ball 130 is formed to be in such a curved shape that the contact surface 143 holds a part of the free ball 130, and the both sides of the stopper 140 each have a convex curved shape, which fits into the ball holding inner peripheral surface 115a. Further, an opposed surface 145 of the stopper 140 to the hinge portion 112 of the adjacent chain link 112 has also a convex curved shape. The free ball 130 is inserted into the free ball-receiving portion R in such a manner that the free ball 130 is rotatably held by the ball holding inner peripheral surface 115a and the contact surface 143. It is noted that the shape of the stopper 140 is not limited to the above-mentioned shape, but the stopper 140 can have any shape if it can rotatably hold the free ball 130 inserted into the free ball-receiving portion R.

In the holding of the free ball with the free ball-receiving portion R, one side of the free ball 130 is supported by the ball holding inner peripheral surface 115a and the opposite side is held by a curved surface of the contact surface 143 of a stopper 140. Thus the free ball is held without being disengaged. In this case, it is not necessary to form the free ball-receiving portions R between all hinge portions 113 and 113 respectively. Alternatively the free ball-receiving portions R may be formed at appropriate intervals and the free balls may be provided in a state where the number of the free balls 130 are adjusted to an appropriate number.

As shown in FIG. 7, the upper and lower portions of free balls 130 inserted into the free ball-receiving portions R each protrude from the article loading portion 111 and the lower end of the link portion 114, respectively. Therefore, the conveyor chain 100 travels in a state where the upper and lower portions of the free ball 130 protrude from the surface and the lower end surface of the conveyor chain 100. In this case the direction of travel of the chain may be any for example forward (regular) or backward (reverse).

As mentioned above, a structure of the conveyor chain 100 was described. The chain links 110 and 110a, the connecting pin 120, the pin disengagement preventing member 150, the stopper 140 and the free ball 130 are preferably made of engineering plastics, which are more lightweight and easily used. However, any materials such as plastics and metal may be used.

The actions and effects of the conveyor chain 100 having the above-mentioned construction are as follows. The conveyor chain 100 is wrapped between sprockets (not shown) and a sprocket tooth (not shown) enters a sprocket engagement portion S of the link portion 114 of the chain link 110 and makes a hinge portion 113 to engage with the sprocket engagement portion S, whereby the chain is traveled. In this case, since a chain link having the same size as in a conventional chain using the conveyor chain 100 without providing free balls 130 therein can be used, sprockets conventionally used in the conveyor chain can be used as they are.

An upper portion of the free ball 130 provided on the conveyor chain 100 is protruded from a surface of the article loading portion 111, an article or articles each having a flat lower surface such as a box, a plate or the like can be slid by free rotations of free balls 130. As a result the discharge of the articles can be easily performed in any directions on during conveying them and the travel direction change of the chain can be also performed.

As shown in FIG. 7, in a case where a guide plate 160 is appropriately disposed on the lower surface side of the conveyor chain 100 so that lower portions of the free balls 130 protruding from the lower ends of the link portions 114 make contact with the guide plate 160, the free balls 130 are rotated in the direction of travel with the traveling of the conveyor chain 100. Thus, articles can be conveyed at an earlier speed (double speed) defined by the addition of a chain speed and the circumferential speed of the free ball 130. It is noted that although, in FIG. 7, the conveyor chain 100 is traveled so that a stopper 140 is placed after the free ball 130 (regular rotation) as shown by an arrow having no parenthesis, it may be traveled so that a stopper 140 is placed before the free ball 130 (reverse rotation) as shown by an arrow in a parenthesis. In such a reverse operation of the conveyor chain, since an end of the hinge portion 112 opposite to a U-shaped cutout portion does not make contact with a rotating free ball 130 due to the presence of the stopper 140, sliding wear of the hinge portion can be suppressed.

Further, since the article loading portion 111 of the chain link 110, forming a conveyor chain 100, is formed of one member, a parts count of the chain link 110 can be reduced. Further, since, a plurality of hinge portions 112 and 113 are formed on both side edges of the article loading portion 111, and between the hinge portions 113 and 113 disposed on one side edge of the article loading portion 111 is formed a U-shaped cutout portion 115 having a ball holding inner peripheral surface 115a, and a free ball 130 inserted between a hinge portion 112 of the chain link 110 oppositely adjacent to the U-shaped cutout portion 115 and the U-shaped cutout portion 115 is rotatably held by the ball holding inner peripheral surface 115a and a stopper 140, the free ball 130 can be held so that it does not come out. Further, even in a case where the free ball 130 is taken out, only removal of a connecting pin 120 and a stopper 140 permits taking out the free ball 130 so that assembly and decomposition of the conveyor chain 100 can be easily performed and a parts count can be reduced. Further, since a stopper 140 is intervened between the free ball 130 and a hinge portion 113 of the adjacent chain link 110 and the hinge portion 113 of the adjacent chain link 110 does not make contact with the free ball 130, wear of the hinge portion 113 of the chain link 110 during reverse operation or rotation is suppressed so that life of the conveyor chain 100 can be lengthened.

DESCRIPTION OF REFERENCE NUMERALS

100 . . . Conveyor chain
110 . . . Chain link
110a . . . Short chain link
111 . . . Article loading portion
112, 113 . . . Hinge portion
114 . . . Link portion
115 . . . U-shaped cutout portion
115a . . . Ball holding inner peripheral surface
116 . . . Groove
120 . . . Connecting pin
130 . . . Free ball
140 . . . Stopper
141 . . . Upper surface
142 . . . Lower surface
143 . . . Free ball contact surface
144 . . . Side surface
145 . . . Opposite surface
150 . . . Pin disengagement preventing member
160 . . . Guide plate
R . . . Free ball-receiving portion
S . . . Sprocket engagement portion While the invention has been described herein by way of Example, those skilled in the art will readily recognize that changes and modifications may be made to the structure of the invention without departing from the spirit and scope of the claimed invention as set forth below.

The invention claimed is:

1. A conveyor chain in which chain links each having an article loading portion on which articles are loaded, a plurality of hinge portions integrally formed on both side edges of the article loading portion and a link portion integrally formed on the back of said article loading portion are adjacently, endlessly connected with each other with connecting pins, characterized in that between the hinge portions disposed on one side edge of said article loading portion is formed a U-shaped cutout portion having a ball holding inner peripheral surface, a free ball inserted between a hinge portion of the chain link oppositely adjacent to the U-shaped cutout portion and said free ball is rotatably held by the ball holding inner peripheral surface and a stopper, and the upper and lower portions of said free ball are protruded from a surface of the article loading portion and a lower end of said link portion, respectively.

* * * * *

UNITED STATES PATENT AND TRADEMARK OFFICE
CERTIFICATE OF CORRECTION

| | |
|---|---|
| PATENT NO. | : 7,137,504 B2 |
| APPLICATION NO. | : 11/193270 |
| DATED | : November 21, 2006 |
| INVENTOR(S) | : Hajime Ozaki et al. |

It is certified that error appears in the above-identified patent and that said Letters Patent is hereby corrected as shown below:

Col. 3, line 61, after "links" delete "1100" and insert -- 110--.

Signed and Sealed this

Thirtieth Day of January, 2007

JON W. DUDAS
*Director of the United States Patent and Trademark Office*